United States Patent
Hamanaka et al.

(12) United States Patent (10) Patent No.: US 6,432,328 B2
Hamanaka et al. (45) Date of Patent: Aug. 13, 2002

(54) METHOD FOR FORMING PLANAR MICROLENS AND PLANAR MICROLENS OBTAINED THEREBY

(75) Inventors: Kenjiro Hamanaka; Kiyotaka Sasaki; Takashi Tagami, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 16 days.

(21) Appl. No.: 09/757,693

(22) Filed: Jan. 10, 2001

(30) Foreign Application Priority Data

Jan. 19, 2000 (JP) .......................................... 2000-010678

(51) Int. Cl.[7] .......................... B29D 11/00; G02B 1/12; G02B 27/10
(52) U.S. Cl. ........................ 264/1.36; 264/2.5; 359/619
(58) Field of Search ................................. 359/619, 620; 264/1.32, 1.7, 2.1, 1.36, 2.5

(56) References Cited

U.S. PATENT DOCUMENTS 6,129,866 A * 10/2000 Hamanaka et al. .......... 264/1.7

* cited by examiner

Primary Examiner—Georgia Epps
Assistant Examiner—Alicia M Harrington
(74) Attorney, Agent, or Firm—Merchant & Gould P.C.

(57) ABSTRACT

In a method for forming a planar microlens according to the present invention, a wet etching is conducted to a glass substrate for a stamper while it is covered with a mask. After the etching is conducted and the mask is removed a wet etching is conducted again to the glass substrate to form densely arranged concave portions thereon, and thereby a stamper is obtained. An uncured resin is applied on the forming surface of the stamper, a glass substrate for a planar microlens array (MLA) is pressed thereto, and thereby the uncured resin is formed. The uncured resin is cured by applying an ultraviolet irradiation thereto and the stamper is released therefrom. The resin layer is removed by a reactive ion etching and whereupon the substrate is etched in a form corresponding to the form of the resin layer and whereby an all-glass microlens of high precision is obtained.

8 Claims, 4 Drawing Sheets

US 6,432,328 B2

METHOD FOR FORMING PLANAR MICROLENS AND PLANAR MICROLENS OBTAINED THEREBY

BACKGROUND OF THE INVENTION

1. Field of the Invention

The present invention relates to a method for forming a planar microlens which is incorporated in a liquid crystal display device or the like, and a planar microlens which is obtained by this method.

2. Description of the Related Art

A molding method using photo-polymers is well known as a method for forming a planar microlens. In this molding method, a glass substrate, a stamper on the forming surface of which a number of nearly spherical concave portions or convex portions are formed and an uncured resin are used. The uncured resin is applied onto the glass substrate or the forming surface of the stamper. Next, the stamper is pushed onto the glass substrate. As a result of this, a press forming of the uncured resin is conducted, and thereby a lens layer made from a resin is formed on the glass substrate, Finally, the lens layer made from a resin is cured by applying an ultraviolet irradiation or the like.

This molding method is suitable for mass-producing a planar microlens at low cost. However, as a planar microlens which is incorporated in a communication device, an all-glass planar microlens is required to enhance qualities thereof.

As a method for mass-producing an all-glass planar microlens, methods using a reactive ion etching (RIE) have been known.

In one method using an RIE, a resin layer (photoresist layer) is formed on the surface of a glass substrate. An exposure is conducted upon the resin layer with a gray scale mask through which a certain amount of light is transmitted, and thereby the exposure amount is partially varied. Next, the resin layer is made to have a number of nearly spherical convex portions through a development process, The surface of the glass substrate is removed together with the resin layer by conducting an RIE to the resin layer, and thereby an all-glass planar microlens is obtained.

In another method using an RIE, a resin layer is formed on the surface of a glass substrate. An etching is conducted to the resin layer selectively to form insular portions thereof. Next, the resin portions remaining in an insular shape are heated and melted to whereupon they take on liquid-drop-shaped convex portions. An RIE is conducted to remove the convex portions, and thereby an all-glass planar microlens is obtained.

In the above-mentioned conventional methods, the lens portion formed on the surface of the glass substrate by an RIE has a thickness nearly equal to the thickness of the resin layer (photoresist layer) formed on the glass substrate in a case where the etching rate of the glass is equal to that of the resin.

In the conventional methods, in a case where the height of the convex portion of the lens or the depth of the concave portion is large (equal to or more than around 15 μm), it is extremely difficult to uniformly form a resin layer (photoresist layer) having a thickness corresponding to the thickness of the lens as desired on the glass substrate. Further, since the convex portions formed through a radiant exposure through a gray scale mask or a melting of a resist remaining in an insular shape are limited to a predetermined shape are formed, the precise shape of the lens as desired cannot be accurately obtained.

SUMMARY OF THE INVENTION

To solve the above-mentioned problems, according to the first aspect of the present invention there is provided a method for forming a planar microlens comprising the steps of forming a stamper having a number of nearly spherical concave portions on the forming surface thereof, forming a resin layer having a number of nearly spherical convex portions on a glass substrate with said stamper, curing said resin layer, and thereafter completely removing said resin layer and forming minute convex lenses having the same shape as the nearly spherical convex portions of said resin layer on the surface of said glass substrate by a reactive ion etching (RIE).

According to the second aspect of the present invention, there is provided a method for forming a planar microlens comprising the steps of forming a stamper having a number of nearly spherical convex portions on the forming surface thereof, forming a resin layer having a number of nearly spherical concave portions on a glass substrate with said stamper, curing said resin layer, and thereafter completely removing said resin layer and forming minute concave lenses having the same shape as the nearly spherical concave portions of said resin layer on the surface of said glass substrate by a reactive ion etching (RIE).

The stamper in the first aspect of the present invention can be obtained by conducting a patterning to the surface of the glass substrate with the surface of the glass substrate being masked, and thereafter conducting a wet etching. It is also possible to form an intermediate mold by a Ni electroforming or a molding using photopolymers in which this stamper is used as a mother mold and to obtain a stamper by transferring this intermediate mold. An accurate transfer of the mold can thereby be achieved, and such a method has the advantage of mass-production.

As the stamper in the second aspect of the present invention, a Ni electroformed mold or a mold formed by a molding using photo-polymers can be used, which is formed by transferring the mother mold in the first aspect of the present invention one time.

Since the stamper and the resin layer which is formed with this stamper are comprised of a similar material, it is preferable to conduct in advance a release treatment to the forming surface of the stamper such as an application of a release agent or the like.

Further, in the present invention, when a material having a lower etching rate than that of the glass substrate is used as a material for the resin layer, it is possible to obtain a planar microlens comprising minute convex lenses having a greater radius of curvature in the peripheral portion of the lens than the top portion of the lens. As a result of this, it is possible to reduce a spherical aberration occurring in the peripheral portion of the lens.

DETAILED DESCRIPTION OF THE PREFERRED EMBODIMENTS

Hereinafter, embodiments according to the present invention will be fully explained with reference to the attached drawings.

Figure 1:
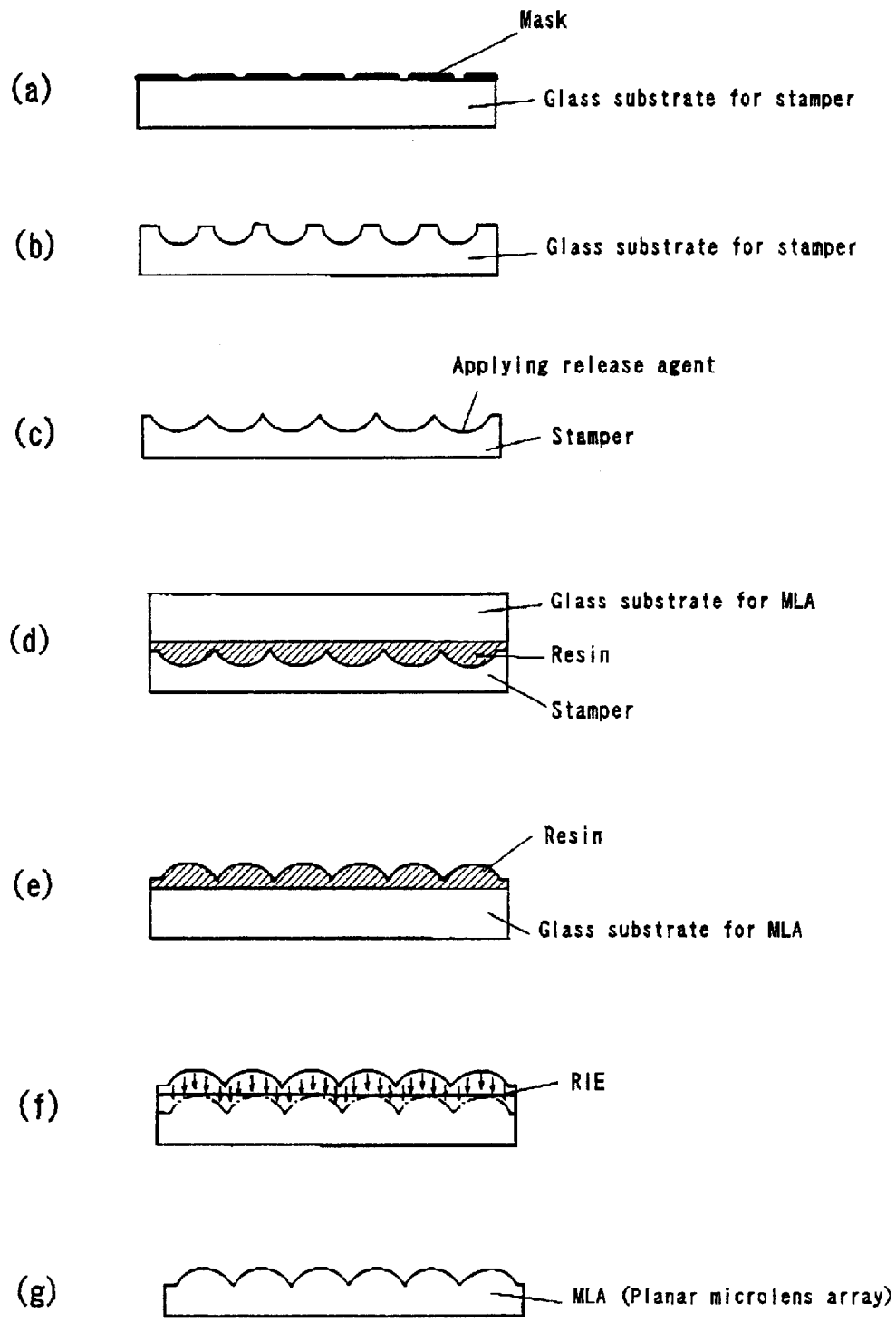
FIG. 1 is a series of views showing a method for forming a planar microlens according to the present invention in the order of process.

As shown in FIG. 1(a), a wet etching is conducted to a glass substrate for a stamper which is covered with a mask made of Cr.

When the mask is removed after the wet (isotropic) etching, concave portions etched into the glass substrate for a stamper are revealed as shown in FIG. 1(b).

Next, a wet etching is conducted again, without a mask, to the surface of the glass substrate for a stamper on which the concave portions are formed. As shown in FIG. 1(c), such two-stage etching enables dense arrangement of the concave portions on the surface of the glass substrate for a stamper. This glass substrate is used as a stamper in this embodiment.

As shown in FIG. 1(d), on the forming surface of the above-mentioned stamper an uncured resin (for example, an ultraviolet-curable resin) is applied. A glass substrate for a planar microlens array (MLA) is pressed thereon, and thereby the uncured resin is formed.

As shown in FIG. 1(e), the uncured resin is cured by applying an ultraviolet irradiation thereto and the stamper is released therefrom. (The objects in this drawing are turned upside down relative to the drawings of the preceding steps to make the next process easy to understand.)

The concave portions which are formed on the resin layer are 20 μm in height, 125 μm in diameter and 105 μm in radius of curvature, for example.

The resin layer is removed by an RIE using $CF_4$, $CHF_3$, $C_2F_6$, $C_5F_8$, $CF+H_2$, or the like as reactive gas. As shown in FIG. 1(f), when the resin layer is removed, parts of the surface of the glass substrate are removed also. As a result, the surface of the glass substrate is formed in the concavo-convex shape of the resin layer. As shown in FIG. 1(g), an all-glass planar microlens is finally obtained.

The lens obtained with this method is 20 μm in height, 125 μm in diameter and 105 μm in radius of curvature. In addition, the focal length thereof is 460 μm and the numerical aperture thereof is 0.27.

Figure 2:
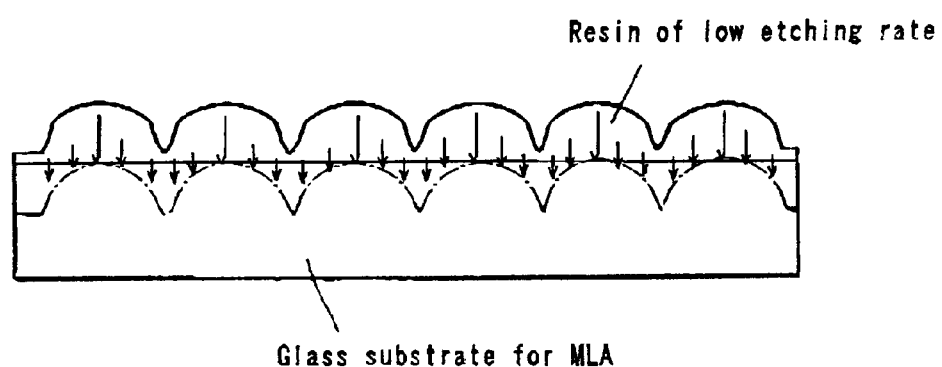
FIG. 2 is a sectional view showing the result of an RIE in a case where a resin having a low etching rate is used.

When the etching rates of the material for the resin layer and the glass are equal, the concavo-convex shape of the resin layer is formed proportionally on the surface of the glass substrate, as shown in FIG. 1(f). However, when the etching rate of the material for the resin layer is lower than that of the glass, it is possible to obtain a planar microlens comprising lenses having a greater radius of curvature in the peripheral portion than the top portion and thereby to reduce a spherical aberration occurring in the peripheral portion, as shown in FIG. 2.

The lens obtained in this case is 40 μm in height, 250 μm in diameter and 210 μm in radius of curvature. In addition, the focal length thereof is 460 μm and the numerical aperture thereof is 0.27.

Figure 3:
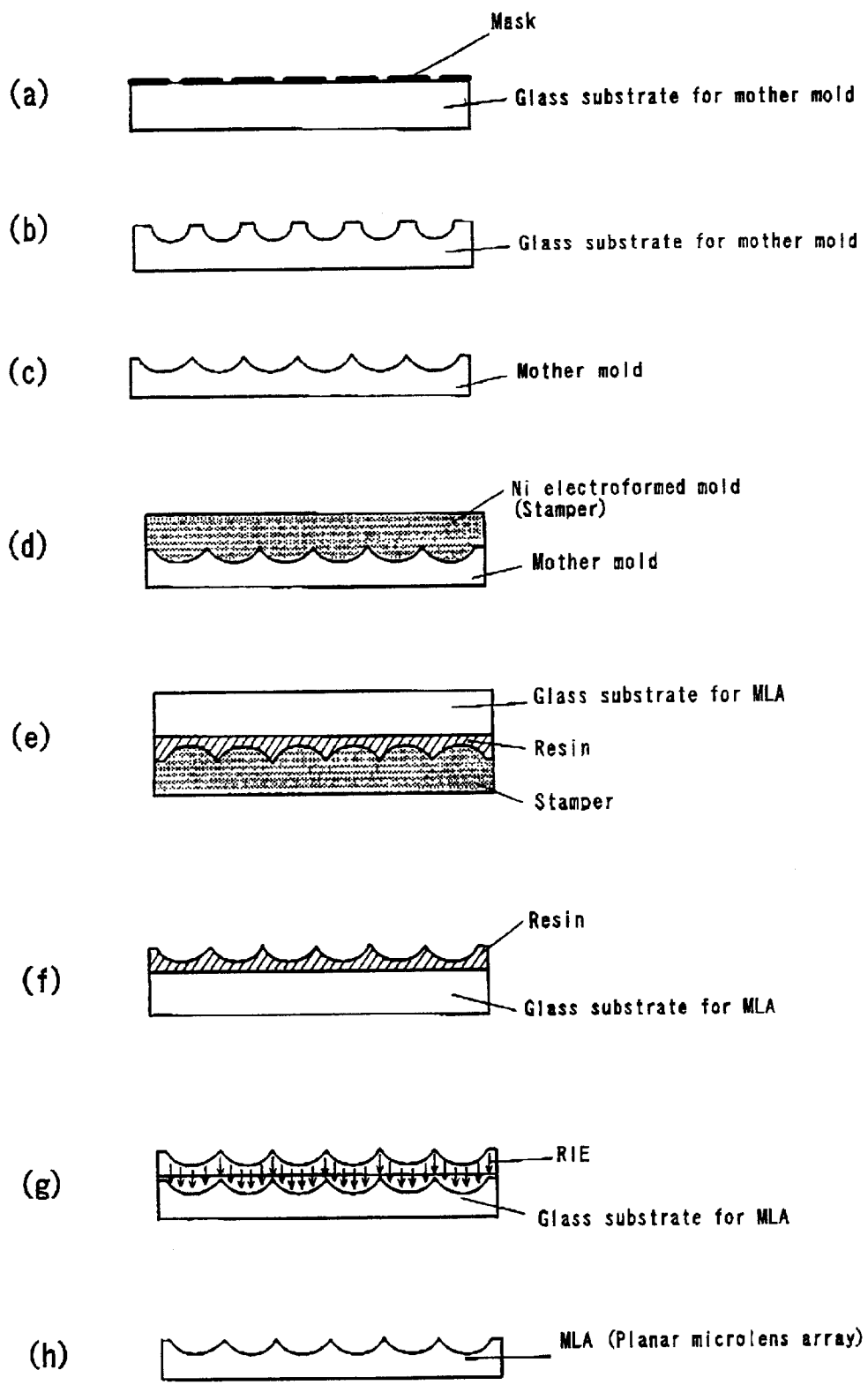
FIG. 3 is a series of views showing a method for forming a planar microlens according to another embodiment of the present invention in the order of process.

Another embodiment shown in FIG. 3 is for forming a planar microlens having a concave shape.

In this embodiment, the processes of FIGS. 3(a)–(c) are the same as FIGS. 1(a)–(c). However, the mold obtained in FIG. 3(c) is used not as a stamper but as a mother mold. As shown in FIG. 3(d), a stamper is formed by a Ni electroforming with this mother mold.

As shown in FIG. 3(e), an uncured resin is applied on the forming surface of the Ni electroformed stamper. A glass substrate for a planar microlens array (MLA) is pressed thereto, and thereby the uncured resin is formed. Next, as shown in FIG. 3(f), the uncured resin is cured by applying an ultraviolet irradiation or the like thereto and the stamper is released therefrom. Then, as shown in FIG. 3(g), the resin layer is removed by an RIE. As shown in FIG. 3(h), an all-glass planar microlens is finally obtained.

The stamper of a resin may be formed by a molding using photo-polymers as well as a Ni electroforming.

Figure 4:
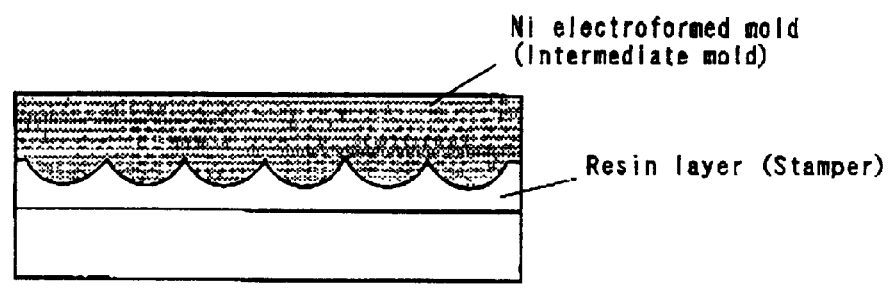
FIG. 4 is a view showing the forming of a stamper according to another embodiment of the present invention.

As shown in FIG. 4, a stamper may be obtained by further transferring the Ni electroformed mold, so as lo form a planar microlens having a convex shape. In this embodiment, a mother mold is obtained by conducting an etching to a glass substrate, a stamper is obtained by transferring two times, and thereby the suitability to use in mass-production is increased. The stamper may be obtained by transferring two times with a molding using photo-polymers as well as a Ni electroforming.

According to the present invention as described above, since the resin layer, to which a reactive ion etching (RIE) is conducted together with the glass substrate, is formed on the glass substrate with the stamper, it is possible to optionally set the thickness of the resin layer and it is also possible to accurately form the shape of the lens corresponding to the convex portion or the concave portion formed on the resin layer. Therefore, it is possible to obtain an all-glass planar microlens, suitable for mass-production, in which the shape of the lens is extremely accurate.

When the material of a lower etching rate than the glass substrate is used as a material for the resin layer formed on the glass substrate, it is possible to form a planar microlens comprising lenses having a greater radius of curvature in the peripheral portion than the top portion and thereby to reduce a spherical aberration occurring in the peripheral portion.

What is claimed is:

1. A method for forming a planar microlens comprising the steps of:

forming a stamper having a number of nearly spherical concave portions on the forming surface thereof;

forming a resin layer having a number of nearly spherical convex portions on a glass substrate with said stamper;

curing said resin layer; and thereafter completely removing said resin layer by a reactive ion etching (RIE) and thereby forming minute convex lenses having the same shape as the nearly spherical convex portions of said resin layer on the surface of said glass substrate.

2. A method for forming a planar microlens according to claim 1, wherein said stamper is obtained by conducting a patterning to the surface of said glass substrate with the surface of said glass substrate being masked and thereafter conducting a wet etching.

3. A method for forming a planar microlens according to claim 1, wherein:

a mother mold is obtained by conducting a patterning to the surface of said glass substrate with the surface of said glass substrate being masked and thereafter conducting a wet etching;

an intermediate mold is obtained by a Ni electroforming or a molding using photopolymers with said mother mold; and said stamper is obtained by transferring said intermediate mold.

4. A method for forming a planar microlens comprising the steps of:

forming a stamper having a number of nearly spherical convex portions on the forming surface thereof;

forming a resin layer having a number of nearly spherical concave portions on a glass substrate with said stamper;

curing said resin layer; and thereafter completely removing said resin layer by a reactive ion etching (RIE) and thereby forming minute concave lenses having the same shape as the nearly spherical concave portions of said resin layer on the surface of said glass substrate.

5. A method for forming a planar microlens according to claim 4, wherein:

a mother mold is obtained by conducting a patterning to the surface of said glass substrate with the surface of said glass substrate being masked and thereafter conducting a wet etching; and said stamper is obtained from said mother mold by conducting a Ni electroforming or a molding using photo-polymers.

6. A method for forming a planar microlens according to claim 1, wherein said resin layer is formed by conducting a release treatment to the forming surface of said stamper.

7. A method for forming a planar microlens according to claim 1, wherein a material being of a lower etching rate than the glass substrate is used as a material for said resin layer.

8. A planar microlens which is obtained by a method for forming a planar microlens according to claim 7, comprising lenses having a greater radius of curvature in the peripheral portion thereof than the top potion thereof.

* * * * *